(No Model.) 3 Sheets—Sheet 2.
W. F. NILES.
MACHINE FOR MOLDING BUTTONS
No. 410,289. Patented Sept. 3, 1889.
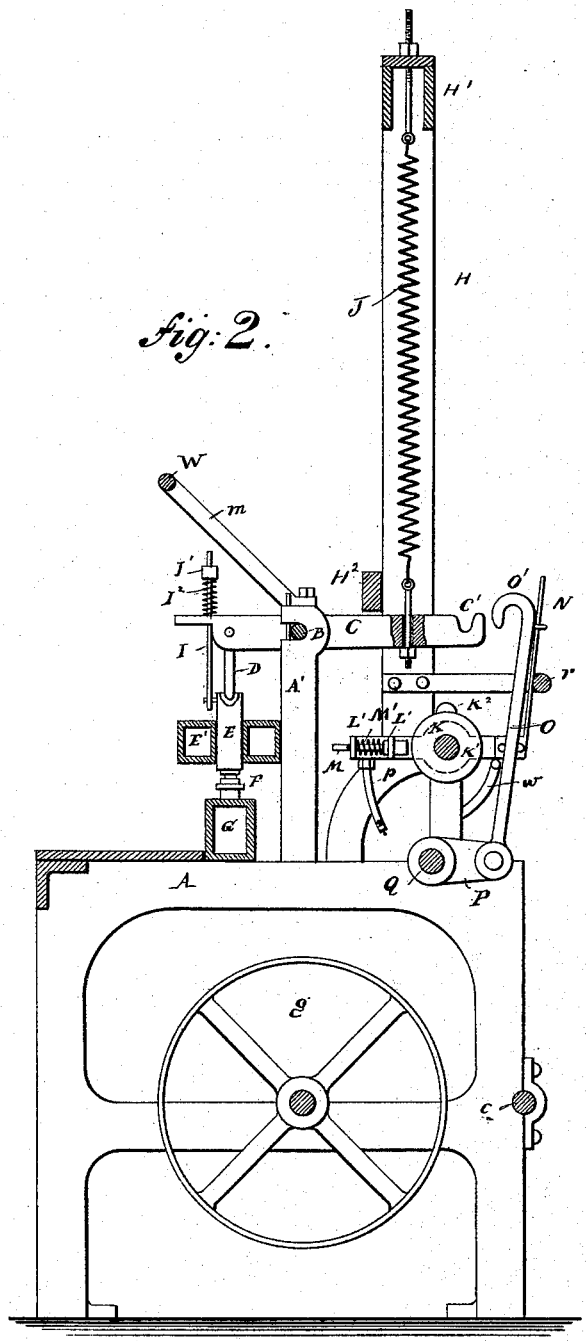
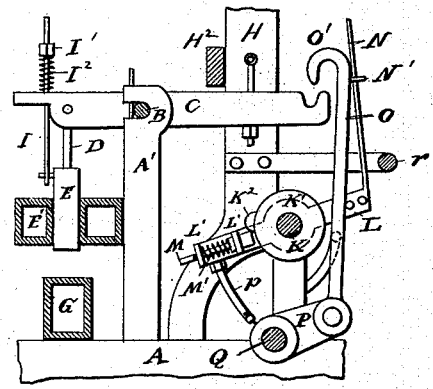
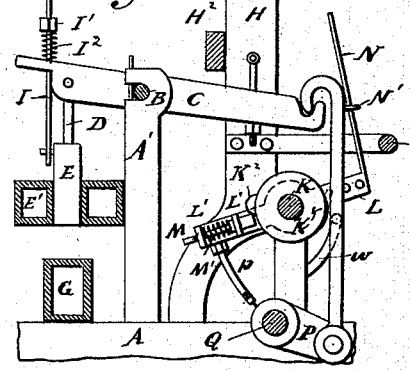
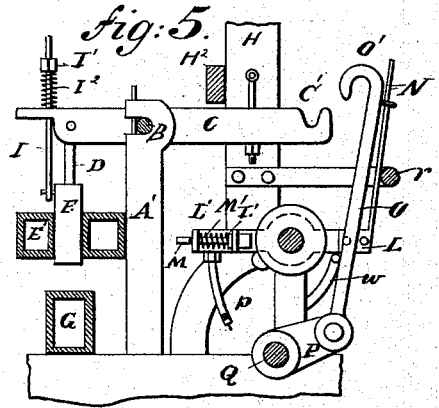
WITNESSES:
A. Schehl.
Carl Kirk
INVENTOR
William F. Niles
BY
Gorpex Raegener
ATTORNEYS.

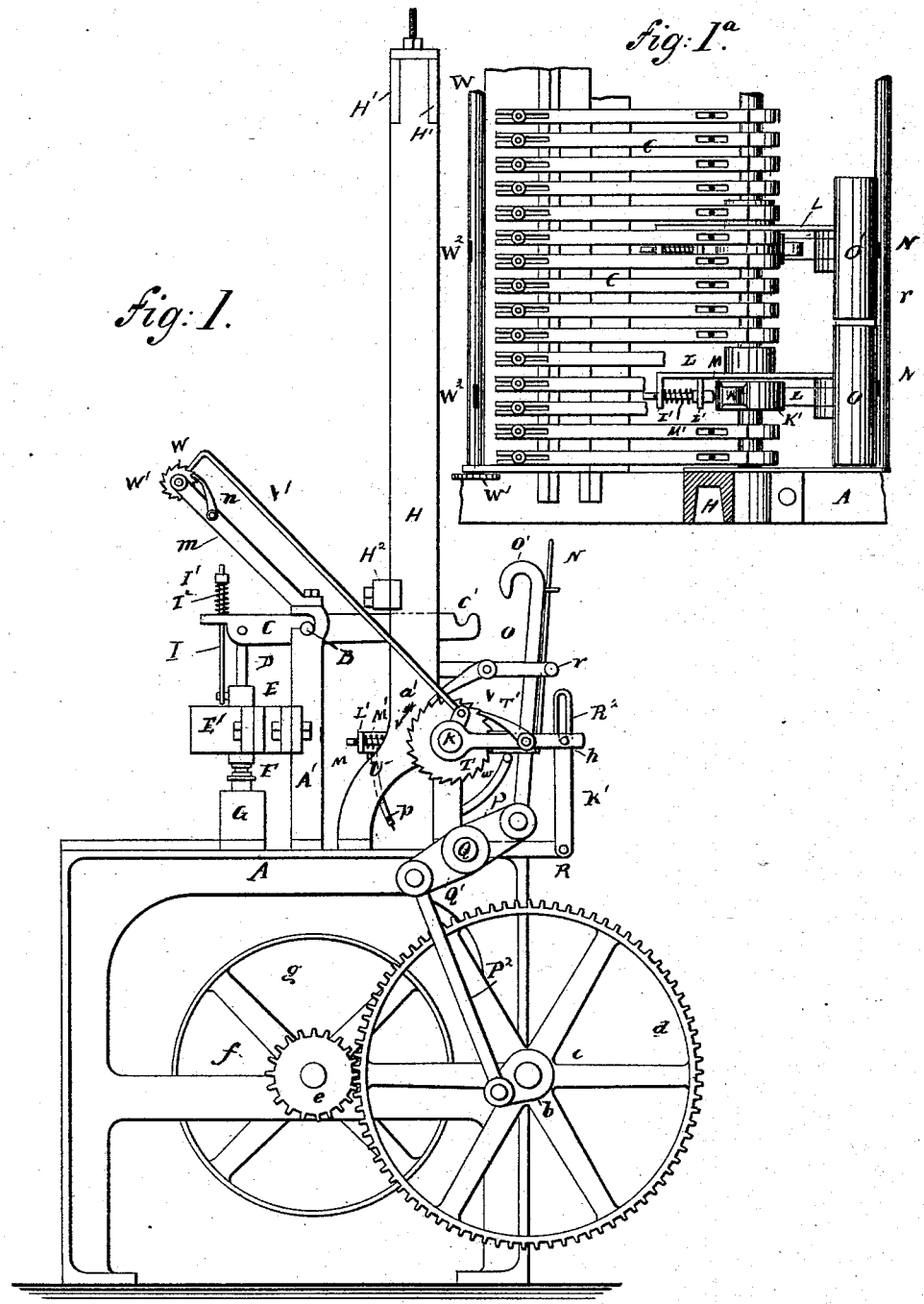

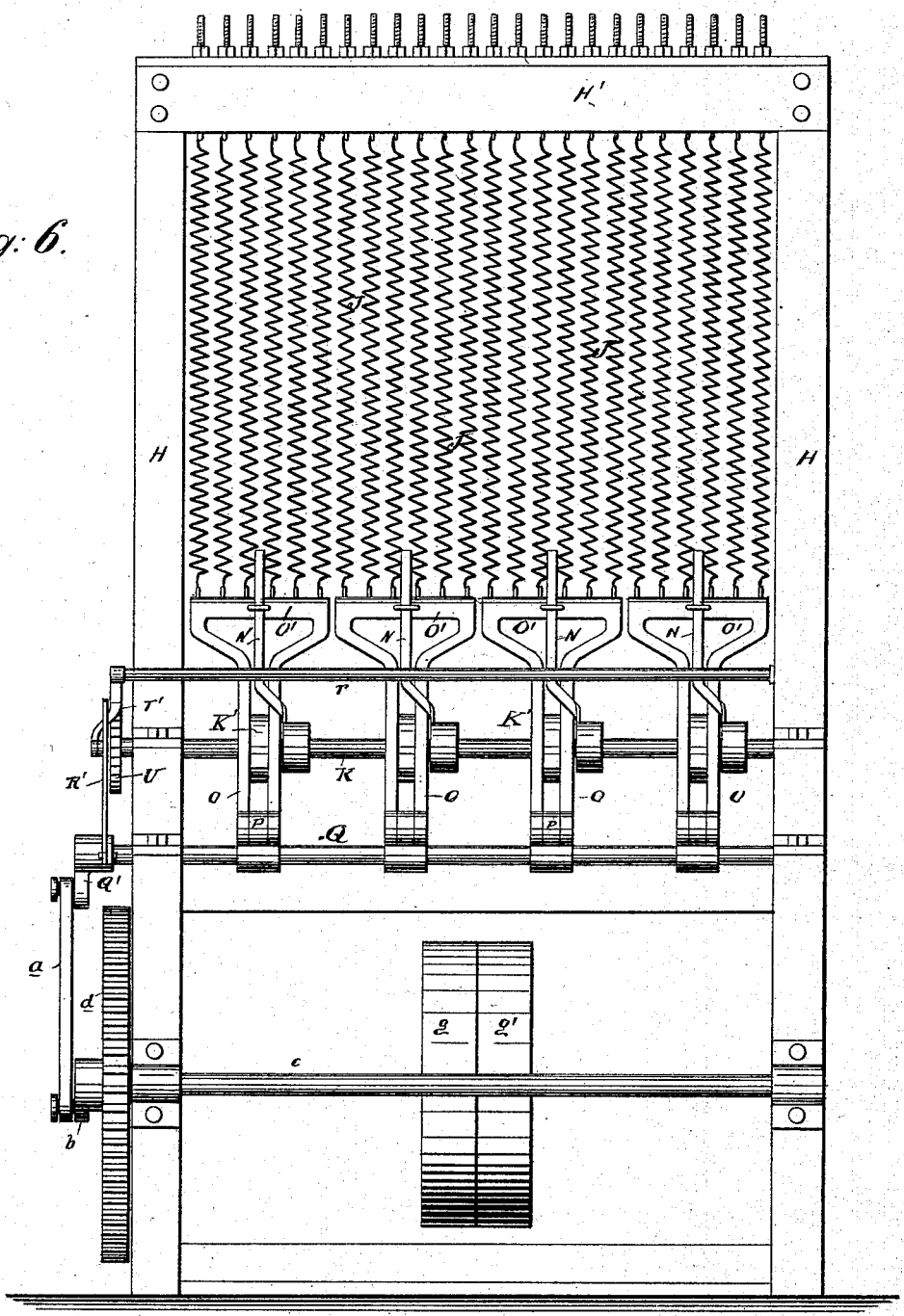

UNITED STATES PATENT OFFICE.

WILLIAM F. NILES, OF JERSEY CITY, NEW JERSEY, ASSIGNOR TO THE VULCANITE MANUFACTURING COMPANY, OF NEW YORK, N. Y.

MACHINE FOR MOLDING BUTTONS.

SPECIFICATION forming part of Letters Patent No. 410,289, dated September 3, 1889.

Application filed March 2, 1888. Serial No. 265,945. (No model.)

*To all whom it may concern:*

Be it known that I, WILLIAM F. NILES, of Jersey City, in the county of Hudson and State of New Jersey, have invented certain new and useful Improvements in Machines for Molding Buttons, &c., of which the following is a specification.

My invention relates to certain new and useful improvements in machines for molding buttons or other articles from a plastic mass.

The object of my invention is to provide a machine of this class which is so constructed that one attendant can easily attend to a number of molds and can fill and empty them easily and rapidly.

My invention consists in a machine for molding buttons, comprising button-molds, plungers for pressing the molds, levers acting on said plungers, and swinging hook-bars for drawing down the levers against the action of the springs, thus releasing the molds from pressure, which hook-bars are set by suitable mechanism.

The invention also consists in the construction and combination of parts and details, as will be fully described and set forth hereinafter, and finally pointed out in the claims.

In the accompanying drawings, Figure 1 is a side view of my improved machine for molding buttons or other articles. Fig. 1$^a$ is a plan view of part of the same, parts being broken out and others in section. Fig. 2 is a vertical cross-sectional view of my improved machine. Figs. 3, 4, and 5 are detail sectional views showing the parts in different positions. Fig. 6 is a rear view of the machine.

Similar letters of reference indicate corresponding parts.

On the frame A the standards A' are provided, and on the same a rod B is held, on which a series of levers C are mounted to swing, each of said levers being provided at one end with a hook C' and with a link D pivoted to the opposite ends, said links extending downward and having their lower ends placed loosely into the upper ends of plungers E, passed through a steam-chest E', said plungers being located above the dies or molds F, which rest on the steam-box G on the frame A. To each plunger E a rod I is pivoted, which passes up through an aperture in the corresponding lever C and is provided at its upper end with a nut I' or other suitable cross-piece, between which nut and the upper edge of the corresponding lever C a spring I$^2$ surrounds the rod I and draws the same upward, thus keeping the top of the corresponding plunger E pressed against the lower end of the link D. The dies or molds F are of any well-known construction.

Standards H, projecting from the top of the frame A, are united at their upper ends by cross-pieces H', to which the upper ends of springs J are held by hooks or other suitable devices, the lower ends of the said springs J being connected by hooks or other suitable devices with the levers C in such a manner as to pull those ends of the levers C provided with the hooks C' upward. A cross-piece H$^2$, uniting the standards H above the levers C, prevents the springs J from pulling the levers C upward too far.

Journaled on the frame A is a shaft $f$, to which power can be applied by means of the belt-pulley $g$, $g'$ being the loose belt-pulley. The shaft $f$, through the pinion $e$ and gear-wheel $d$, imparts rotary motion to the crank-shaft $c$ and crank $b$. Above the crank-shaft $c$ a rock-shaft Q is journaled, on the end of which a rocker-arm Q' is formed, connected by the rod P$^2$ with the crank $b$. A series of arms P are fastened on the rock-shaft Q, and to each arm P a swinging hook-bar O is pivoted, which is wide enough at its upper or hooked end O' to engage with as many levers C' as is desired—in the case shown six.

In the standards H the shaft K is journaled, and has fastened on its end outside of its journal the ratchet-wheel U, and opposite the center of each hook-bar O a wheel K', each of which is provided with a projection K$^2$, of the shape shown or any other suitable shape. Upon the end of the shaft K a pawl-arm T is mounted to rock, on which a pawl T' is pivoted to engage the teeth of the ratchet-wheel U. A stop or rest $w$, projecting from one of the standards H, prevents the pawl-arm T from being moved downward too far. A rocker-arm R, fastened on the rock-shaft Q, has pivoted to its end the connecting-rod R', having the longitudinal slot R², through which the pin $h$ of the pawl-arm T passes, so that the connecting-rod can slide on the pin $h$, and at the proper time of the stroke the lower end of the slot R² can strike the pin $h$ and swing the pawl-arm T upward. Upon the shaft K a bent lever L is mounted to rock or swing at the side of each of the wheels K', the vertical arms N of which levers L are made thin to act as springs, and said spring-arms pass freely through loops N', fastened on the upper end of the hook-bars O. A rod $r$, parallel with the shaft K, is supported by arms of the uprights H of the frame, and serves as a support for the spring-arms of the levers L, and the hook-bars O are in turn supported by the said spring of the levers L. Each of the bent levers L is provided at the lower end with the lugs L', which project from that side of the lever facing the adjacent wheel K' and carry the sliding bolt M, which is pressed toward the shaft K and the rim of the wheel K' by the spring M' surrounding said bolt M. The end of the sliding bolt M adjacent to the rim of the wheel K' is shaped to form a head. The pawl-arm T has a short arm V, to which a pawl-rod V' is pivoted, which acts on a toothed wheel W', fastened on a shaft W, journaled in arms $m$ on the standards A'. The shaft W has marks W² at proper intervals, which, as they rotate into view, indicate to the operator that that set of levers opposite the mark in sight is to be operated upon by its hook-bar O. The lever L is provided with a curved stop $p$, which can strike against a corresponding collar on the shaft Q and serves for the purpose of stopping the lever L and to prevent the inner end of the same being swung downward too far.

The operation of each section of six levers is as follows: During the time that the molds are under pressure the several parts are in the position shown in Fig. 1. The shaft Q is rocked from the main shaft $f$ by means of the devices described, whereby the hook-arms O are moved up and down, as is also the pawl-arm T, the pawl T' of which revolves the toothed wheel U of the shaft K and the wheels K' with an intermittent rotary motion in the direction of the arrow $a'$, Fig. 1. When a projection K² of the wheel K' strikes the sliding bolt M of the corresponding bent lever L, the said lever is carried downward until the stop $p$ on the same strikes a collar on the rock-shaft Q. Thereby the vertical spring-arm N of said levers is moved inward toward the hook ends C' of the levers C and carries with it the corresponding hook-bar O, which at the same time that it is swung inward is also on the latter part of its upward stroke, and its hook end O' is above the hook ends of the corresponding set of six levers C' at the highest point of their stroke, which is when resting against the stop-bar H². The lever-stop $p$ is so arranged that the inward swing of the levers L N and the hook-bar O is stopped at the extreme end of the upstroke of the hook-bar, the hook O' being over the hook ends C' of the corresponding levers C, Fig. 3. The next downstroke engages the hook O' with the hooks C' of the next set of six levers C and carries them down, thereby raising the opposite ends of the levers C and the pressure-plungers E, whereby the molds are released and a freshly-charged set of molds can be introduced, the parts being in the above-described position, as shown in Fig. 4. The upstroke of the hook-bar O and other parts then takes place, permitting the plungers to descend upon the molds, the lever ends C' stopping in their upward motion at any point of their stroke, determined by the thickness of the molds. The hook-bar O continues its upstroke until above and clear of the lever-hooks C'. The ratchet-and-pawl mechanism T U acts as described, and the cam projection of the corresponding wheel K' acts on the bolt M and presses the same back, thus giving way for the projection K² to pass. Then the lever-arm L N, with the connecting hook-bar O, swings back against the stop-rod $r$ by the action of its own weight, or, if desired, by a weight connected with it by means of suitable devices. The section of six hook-bars and mechanism connected therewith have then resumed the position shown in Fig. 1, and the molds under the ends of the levers C of each section remain under pressure until the ratchet-wheel U has again brought the projection of a corresponding wheel K' to act on the corresponding bent lever L and its hook-bar O. As the toothed wheel U is only rotated one tooth for each revolution of the shaft $b$, I have found it practicable to arrange a series of sections of six levers each and mechanism connected therewith in each machine, each section to work in rotation, as determined by the position in the circle of rotation of their projections K². Fig. 6 shows four sections of six pressure-levers each. During the time that the plungers of one group are raised the plungers of the other groups are lowered and compress the material. The attendant is thus enabled to attend to the several groups successively. The steam-chests are provided to keep the dies or molds heated and to dry and harden the plastic material.

Having thus described my invention, I claim as new, and desire to secure by Letters Patent—

1. In a machine for making buttons or other articles, the combination, with molds, of plungers, levers for pressing down the plungers, springs connected with said levers, a rock-shaft provided with a hook-bar for drawing down the outer ends of the levers in raising the plungers, and mechanism, substantially as shown and described, for shifting the hook-bar, substantially as set forth.

2. In a machine for molding buttons or other articles, the combination, with a series of plungers, of pivoted levers acting on the same, springs acting on the levers, a series of hook-arms which act on the levers, and mechanism for swinging the hook-arms toward the ends of the levers, substantially as shown and described.

3. In a machine for molding buttons or other articles, the combination, with a series of plungers, of levers acting on the same, springs acting on the levers, a rock-shaft carrying hook-arms which can act on the levers, a shaft operated from the rock-shaft and provided with wheels having cam teeth or projections, levers mounted to swing on the shaft carrying the wheels provided with the cam projections, on which levers the cam projections can act, said levers having springs acting on the hook-arms on the rock-shaft and moving them toward the ends of the levers connecting with the plungers, substantially as shown and described.

4. In a machine for molding buttons or other articles, the combination, with plungers, levers connected with the same, hook-arms acting on the levers, and springs acting on the levers, of the levers L, mounted loosely on the shaft K and adapted to act on the hook-arms, and wheels mounted on the shaft K and provided with cam teeth or projections that act on the levers L, substantially as shown and described.

5. In a machine for molding buttons or other articles, the combination, with plungers, levers acting on the same, and springs acting on the levers, of the shaft K, the levers L, mounted loosely on the same and carrying sliding bolts M, the cam-wheels K' on the shaft K, and springs secured to the levers and acting on the hook-arms, substantially as shown and described.

6. In a machine for molding buttons or other articles, the combination, with plungers, levers acting on the same, springs acting on the levers, and hook-arms adapted to act on the levers, of the shaft K, the levers L, mounted loosely on the same and operated by cam-wheels on the shaft K, said levers L being adapted to act on the hook-arms, the ratchet-wheel U on the end of the shaft K, and a rock-arm and pawl for revolving said ratchet-wheel from the shaft that operates the hook-arms, substantially as shown and described.

7. In a machine for molding buttons or other articles, the combination, with a series of groups of plungers, of levers acting on the plungers, a rock-shaft, provided with a hook-arm for each group of levers, an indicator-shaft provided with a mark for each group of levers, and gearing for operating the indicator-shaft from the same mechanism that operates the hook-arms, substantially as shown and described.

8. In a machine for molding buttons or other articles, the combination, with a series of groups of plungers, of levers acting on the plungers, a rock-shaft having a hook-arm for each group of levers, a shaft carrying cam-wheels, levers actuated by said cam-wheels and mounted on the shaft carrying the latter, which levers act on the hook-arms, gearing for driving the shaft carrying the cam-wheels from the rock-shaft, an indicator-shaft provided with a mark for each group of plungers, and mechanism for operating the indicator-shaft from the shaft carrying the cam-wheels, substantially as set forth.

In testimony that I claim the foregoing as my invention I have signed my name in presence of two subscribing witnesses.

WILLIAM F. NILES.

Witnesses:
 HERMAN GUSTOW,
 GEORGE COOK.